United States Patent
Katayama et al.

(10) Patent No.: US 8,128,291 B2
(45) Date of Patent: Mar. 6, 2012

(54) NEEDLE ROLLER BEARING AND BEARING STRUCTURE

(75) Inventors: Akihiko Katayama, Kikugawa (JP); Shinji Oishi, Iwata (JP); Yugo Yoshimura, Iwata (JP); Noriaki Fujii, Wako (JP); Tomoya Fujimoto, Wako (JP)

(73) Assignees: NTN Corporation, Osaka (JP); Honda Motor Co., Ltd., Tokyo (JP)

( * ) Notice: Subject to any disclaimer, the term of this patent is extended or adjusted under 35 U.S.C. 154(b) by 620 days.

(21) Appl. No.: 11/989,421

(22) PCT Filed: Jul. 14, 2006

(86) PCT No.: PCT/JP2006/314083
§ 371 (c)(1),
(2), (4) Date: Jan. 25, 2008

(87) PCT Pub. No.: WO2007/013316
PCT Pub. Date: Feb. 1, 2007

(65) Prior Publication Data
US 2009/0136169 A1    May 28, 2009

(30) Foreign Application Priority Data
Jul. 26, 2005 (JP) .................................. 2005-215793

(51) Int. Cl.
*F16C 19/46* (2006.01)
*F16C 33/46* (2006.01)

(52) U.S. Cl. .................... 384/457; 384/570; 384/585

(58) Field of Classification Search .............. 384/457, 384/570, 585
See application file for complete search history.

(56) References Cited

U.S. PATENT DOCUMENTS

| 1,921,488 | A |   | 8/1933  | Smith |
|-----------|---|---|---------|-------|
| 3,883,194 | A | * | 5/1975  | Pitner ............................ 384/582 |
| 5,419,641 | A | * | 5/1995  | Fujinami et al. ............... 384/470 |
| 7,311,447 | B2| * | 12/2007 | Takeo et al. .................... 384/457 |
| 2003/0165281 | A1 |  | 9/2003 | Fujioka et al. |
| 2005/0084192 | A1 |  | 4/2005 | Takeo et al. |

FOREIGN PATENT DOCUMENTS

| CN | 2338536    | 9/1999 |
|----|------------|--------|
| EP | 0 013 628  | 7/1980 |
| JP | 55-107118  | 8/1980 |
| JP | 4-357325   | 12/1992 |
| JP | 2005-180459 | 7/2005 |

* cited by examiner

*Primary Examiner* — William C Joyce
(74) *Attorney, Agent, or Firm* — Clark & Brody

(57) ABSTRACT

A needle roller bearing comprises an outer ring having a plurality of outer ring members split by a parting line extending in the axial direction of the bearing, a plurality of needle rollers rotatably arranged on the raceway surface of the outer ring, and a retainer retaining the plurality of needle rollers. A curvature radius $r_1$ of the outer ring member and a curvature radius $r_2$ of the outer diameter of the retainer has a relation such that $1 < r_1/r_2 < 1.3$.

2 Claims, 6 Drawing Sheets

NEEDLE ROLLER BEARING AND BEARING STRUCTURE

BACKGROUND OF THE INVENTION

1. Field of the Invention

The present invention relates to a needle roller bearing and a bearing structure that support a crankshaft, a camshaft, a balance shaft, and a rocker shaft of a car and the like.

2. Description of the Background Art

Conventionally, as a bearing that supports a crankshaft 1 of a car and the like as shown in FIG. 6, a split type of sliding bearing has been used in general. Since the sliding bearing has high load capacity, it is suitable for being used in a high load environment.

However, as a fuel-efficient car is demanded in view of an environment recently, a needle roller bearing is used instead of the sliding bearing in some cases. Although the needle roller bearing has low load capacity as compared with the sliding bearing, since its friction resistance during rotation is small, an oil amount at a supporting part can be reduced.

However, a needle roller bearing to support a crank pin 2 of the crankshaft 1 cannot be press fitted in the axial direction. Thus, a needle roller bearing that can be used in this place is disclosed in U.S. Pat. No. 1,921,488, for example.

According to the document, the needle roller bearing comprises an outer ring, a plurality of needle rollers rotatably arranged on the raceway surface of the outer ring, and a retainer retaining the needle rollers. In addition, the outer ring comprises outer ring members 4a and 4b split by a parting line extending in the axial direction of the bearing as shown in FIG. 7, so that it can be incorporated in the crank pin 2. The same is true of the retainer.

The above needle roller bearing and a housing holding the outer ring of the needle roller bearing are separately manufactured in general. As a result, an error between a curvature radius of the outer ring and a curvature radius of the inner diameter of the housing could be generated.

When the curvature radius of the outer ring is smaller than that of the inner diameter of the housing, a gap is generated between the outer ring and the housing. Meanwhile, in a case where the curvature radius of the outer ring is larger than that of the inner diameter of the housing too much, when the outer ring is forcibly incorporated, the raceway surface of the outer ring could be undulated or damaged.

In either case, since the smooth rotation of the needle roller is hindered, a vibration or noise is generated.

SUMMARY OF THE INVENTION

It is an object of the present invention to provide a needle roller bearing comprising an outer ring member that has an appropriate configuration along an inner diameter surface of a housing when held in the housing. In addition, it is another object of the present invention to provide a bearing structure comprising the above needle roller bearing.

A needle roller bearing according to the present invention comprises an outer ring having a plurality of outer ring members split by a parting line extending in the axial direction of the bearing, a plurality of needle rollers rotatably arranged on the raceway surface of the outer ring, and a retainer retaining the plurality of needle rollers. Thus, a curvature radius $r_1$ of the outer ring member and a curvature radius $r_2$ of the outer diameter of the retainer has a relation such that $1 < r_1/r_2 < 1.30$.

When the above needle roller bearing is incorporated in a housing, the outer ring member is elastically deformed and has an appropriate configuration along the inner diameter surface of the housing. Thus, the needle roller bearing can maintain the smooth rotation of the needle roller.

Preferably, the outer ring member has an engagement part engaging with the housing to be positioned, at a position shifted from the center in its circumferential direction. According to the above constitution, the positioning engagement part is provided in the outer ring member to prevent the rotation of the outer ring in the circumferential direction. Thus, since a boundary of the outer ring members does not move toward a load region, a trouble such as a rotation defect of the needle roller or a damage of the outer ring can be avoided.

Preferably, the needle roller bearing comprises a retainer retaining intervals between the plurality of needle rollers and the outer ring member has an engagement click provided at an end in its width direction and protruding toward the inner side in its diameter direction to prevent the retainer from moving in the axial direction. According to the above constitution, since the engagement click is provided at the end of the outer ring member in the width direction, the retainer is prevented from moving in the axial direction without processing a peripheral structure such as a shaft.

A bearing structure according to the present invention comprises a needle roller bearing comprising an outer ring having a plurality of outer ring members split by a parting line extending in the axial direction of the bearing, a plurality of needle rollers rotatably arranged on the raceway surface of the outer ring, and a retainer retaining the plurality of needle rollers, and a housing holding the outer ring of the needle roller bearing. Thus, a curvature radius $r_1$ of the outer ring member and a curvature radius $r_3$ of the inner diameter of the housing has a relation such that $1 < r_1/r_3 < 1.30$.

When the needle roller bearing having the above constitution is incorporated in the housing, the outer ring member is elastically deformed and has an appropriate configuration along the inner diameter surface of the housing. Thus, the needle roller bearing can maintain the smooth rotation of the needle roller bearing.

Since the outer ring that is elastically deformed to have the appropriate configuration along the inner diameter surface of the housing is provided, the needle roller bearing and the bearing structure can maintain the smooth rotation of the needle rollers.

DESCRIPTION OF THE PREFERRED EMBODIMENTS

Figure 1A:
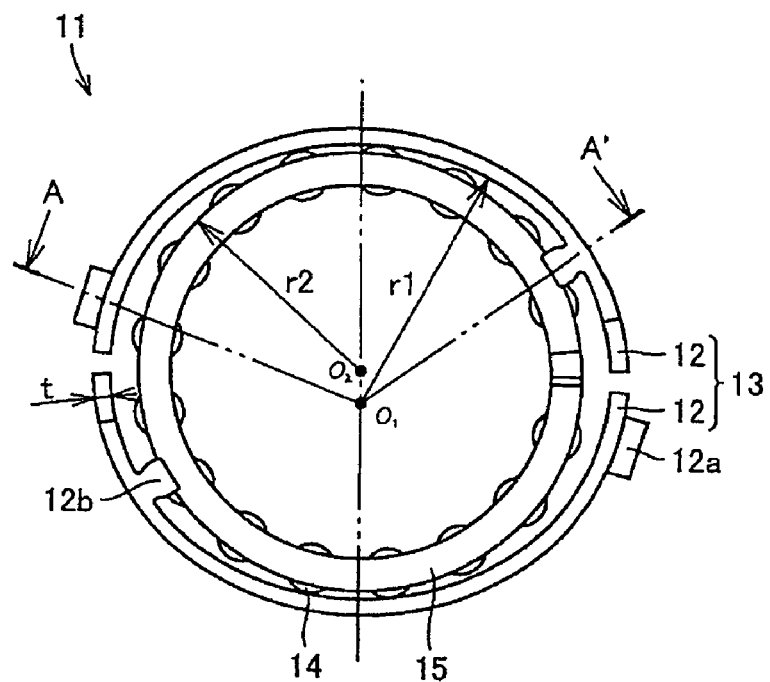
FIG. 1A is a front view showing a needle roller bearing according to one embodiment of the present invention.
Figure 1B:
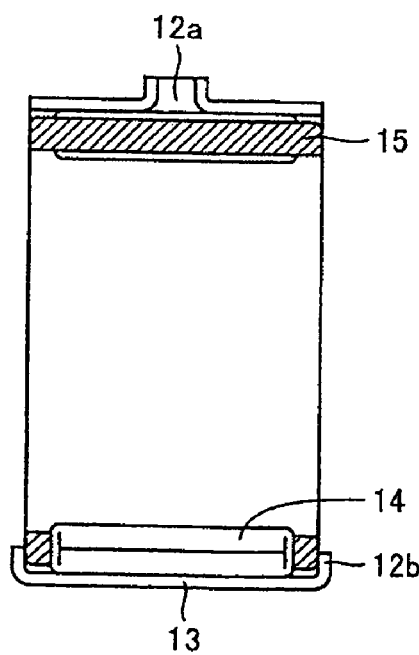
FIG. 1B is a sectional view taken along line A-A' in FIG. 1A.

A needle roller bearing 11 according to one embodiment of the present invention will be described with reference to FIGS. 1A to 3B hereinafter.

The needle roller bearing 11 comprises an outer ring 13 having two outer ring members 12 split by a parting line extending in the axial direction of the bearing, a plurality of needle rollers 14 rotatably arranged on the raceway surface of the outer ring 13, and a retainer 15 retaining the needle rollers 14. In addition, it is to be noted that the parting line of the outer ring 13 may only have to split the outer ring 13 in the diameter direction and it does not always coincide with the axial direction strictly.

A curvature radius $r_1$ of the outer ring member 12 and a curvature radius $r_2$ of an outer diameter of the retainer 15 satisfy a relation such that $1<r_1/r_2<\alpha$. Here, $\alpha$ value a varies depending on a thickness "t" of the outer ring member 12 as shown in Table 1. In this case, when the circumscribing circle of the needle roller 14 aligns with the inner diameter surface of the outer ring member 12 at an axis of symmetry of the outer ring member 12, a curvature center $o_1$ of the outer ring member 12 and a curvature center $o_2$ of the retainer 15 exist at different positions.

TABLE 1

Relation of curvature radiuses between outer ring and retainer outer diameter

| Thickness "t" | $0 < t \leq 0.8$ | $0.8 < t \leq 1.2$ | $1.2 < t \leq 2.0$ | $2.0 < t$ |
|---|---|---|---|---|
| α | 1.30 | 1.25 | 1.20 | 1.15 |

When the curvature radius $r_1$ of the outer ring member 12 is smaller than the curvature radius $r_2$ of the outer diameter of the retainer 15, a gap is generated between the outer ring 13 and a housing. In addition, in this case, the outer ring member 12 squeezes the retainer 15, so that the smooth rotation of the needle roller 14 is hindered. Therefore, it is necessary to satisfy that $1<r_1/r_2$.

Meanwhile, in a case where the curvature radius $r_1$ of the outer ring member 12 is larger than the $r_2$ of the outer diameter of the retainer 15 too much, when the retainer is forcibly incorporated, the raceway surface of the outer ring member 12 could be undulated or damaged. Thus, the value α varies depending on the thickness "t" of the outer ring member 12 as shown in Table 1. Here, the reason why the value of the α is increased as the thickness "t" is reduced is that as the thickness becomes small, elastic deformability becomes high.

According to the above constitution, when the needle roller bearing 11 is incorporated in the housing, since the outer ring member 12 is elastically deformed and has a configuration along the housing, the needle roller bearing 11 can maintain the smooth rotation of the needle rollers 14.

Figure 2A:
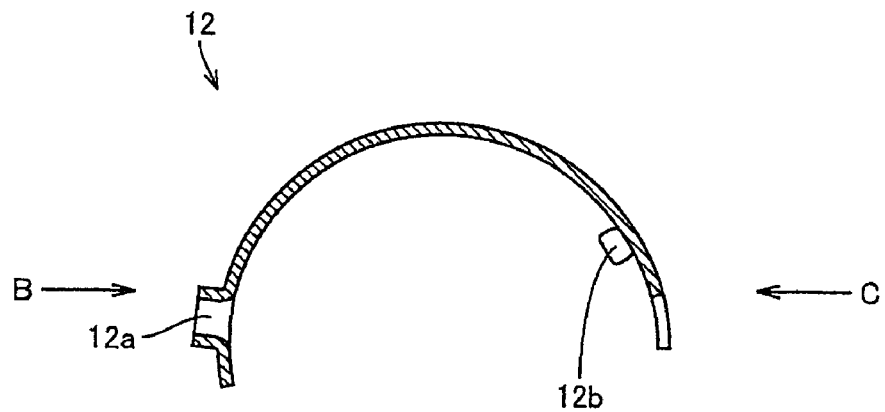
FIG. 2A is a longitudinal sectional view showing an outer ring member of the needle roller bearing according to one embodiment of the present invention.

The above relation can be applied to various kinds of needle roller bearings having split outer rings. According to this embodiment, as shown in FIG. 2A, the outer ring member 12 comprises a projection 12a at a position shifted from the center in the circumferential direction thereof as an engagement part with the housing to be positioned, and an engagement click 12b projecting from an end of the outer ring member 12 in the width direction toward inner side in the diameter direction, to prevent the retainer 15 from moving in the axial direction.

Figure 2B:
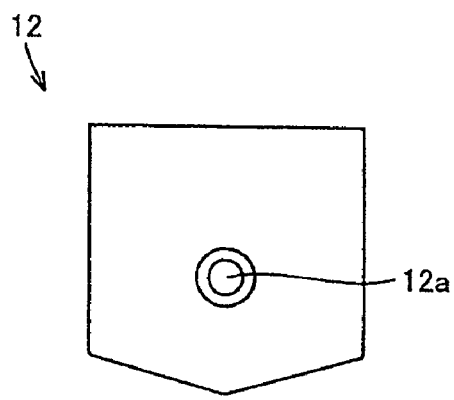
FIG. 2B is a view showing the outer ring member taken from the direction of an arrow B in FIG. 2A.
Figure 2C:
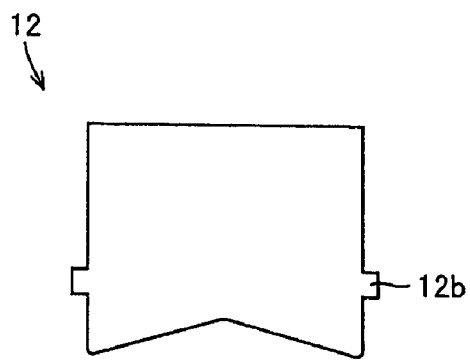
FIG. 2C is a view showing the outer ring member taken from the direction of an arrow C in FIG. 2A.

In addition, as shown in FIGS. 2B and 2C, one end of the outer ring member 12 in the circumferential direction is projected and the other end thereof is recessed, and the cylindrical outer ring 13 is formed by coupling the projected and the recessed parts.

According to the needle roller bearing 11 having the above constitution, since a part of the outer ring 13 and a part of the retainer 15 are cut, it can be used as a bearing that supports a component such as a crankshaft, a camshaft, a balance shaft, a rocker shaft of a car and that like in which a bearing cannot be press fitted in the axial direction.

Thus, the projection 12a is provided in the outer ring member 12 to prevent the outer ring 13 from rotating in the circumferential direction, and the engagement click 12b is provided to prevent the retainer 15 from moving in the axial direction.

Figure 3A:
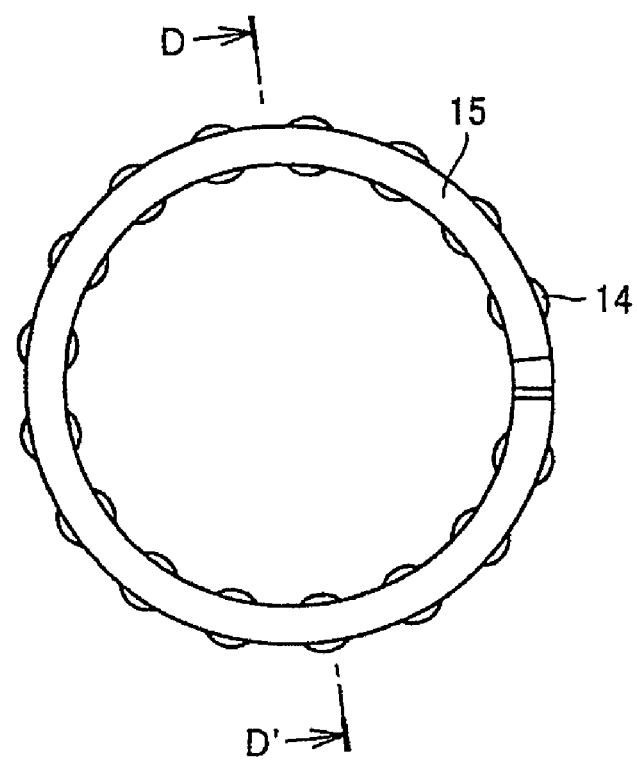
FIG. 3A is a front view showing a retainer of the needle roller bearing according to one embodiment of the present invention.
Figure 3B:
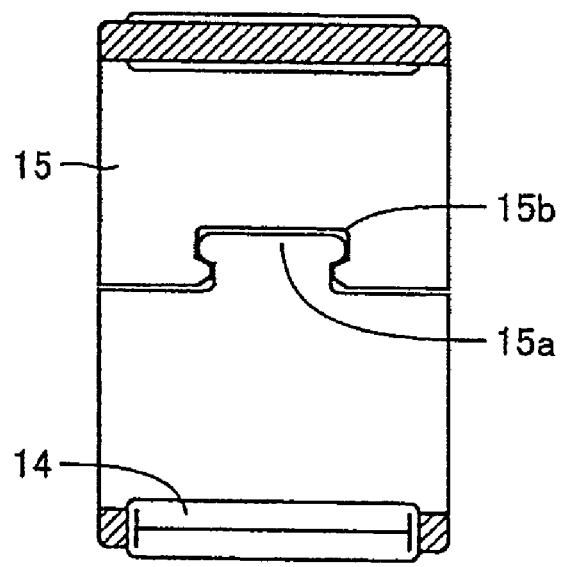
FIG. 3B is a sectional view taken along line D-D' in FIG. 3A.

The retainer 15 is formed of a resin material and has pockets to hold the needle rollers 14 in the circumferential direction as shown in FIG. 3A. In addition, as shown in FIG. 3B, it has a joint comprising a projected part 15a and a recessed part 15b at an abutment end provided on a circumference and cut in the axial direction in which cut surfaces abut on each other. Thus, the retainer 15 is elastically deformed to be incorporated in a shaft and then the projected part 15a and the recessed part 15b of the cut surfaces are joined to prevent the abutment end from being shifted in the axial direction.

According to the retainer 15 having the above constitution, the joint comprising the projected part 15a and the recessed part 15b prevents one of the cut surface from shifting in the axial direction.

Although the joint comprises one projected part 15a and one recessed part 15b in the above embodiment, the present invention is not limited to this. For example, a joint may comprise a plurality of combined projected parts and recessed parts.

Although the outer ring 13 comprises the two outer ring members 12 split in the diameter direction in the above embodiment, the present invention is not limited to this. For example, an outer ring may be split into any number.

Although the one projection 12a and the one engagement click 12b are provided in each outer ring member 2 in the above embodiment, the present invention is not limited to this. They may be provided over the entire circumference of the outer ring 13 or a plurality of them may be provided in each outer ring member 12.

Furthermore, although the engagement click 12b is provided at the end of the outer ring member 12 in the axial direction in the above embodiment, an engagement click 12b may be provided over an entire end of the outer ring member in the axial direction.

Still furthermore, the retainer 15 may be formed of a metal material using a pressing process instead of a resin, or the present invention may be applied to a full-type roller bearing without comprising the retainer 15.

Figure 4:
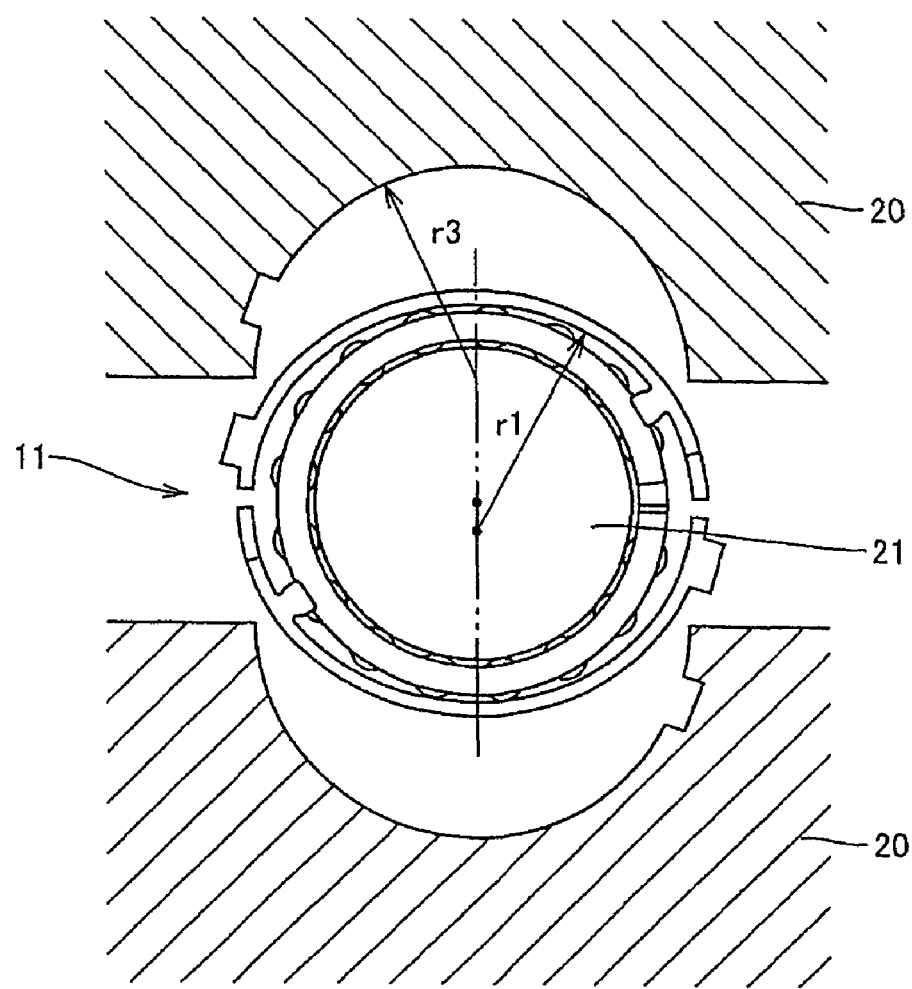
FIG. 4 is a view showing a relation of curvature radiuses between the outer ring member and a housing before the needle roller bearing is incorporated.

Next, a relation between the needle roller bearing 11 shown in FIG. 1A and a housing 20 that holds the needle roller bearing 11 will be described with reference to FIGS. 4 and 5.

The curvature radius $r_1$ of the outer ring member 12 and a curvature radius $r_3$ of the inner diameter of the housing 20 satisfy a relation such that $1<r_1/r_3<\beta$. Here, a value β varies depending on the thickness "t" of the outer ring member 12 as shown in Table 2.

TABLE 2

| | Relation of curvature radiuses between outer ring and housing inner diameter | | | |
|---|---|---|---|---|
| Thickness "t" | 0 < t ≦ 0.8 | 0.8 < t ≦ 1.2 | 1.2 < t ≦ 2.0 | 2.0 < t |
| β | 1.30 | 1.25 | 1.20 | 1.15 |

When the curvature radius $r_1$ of the outer ring member 12 is smaller than the curvature radius $r_3$ of the inner diameter of the housing 20, a gap is generated between the outer ring 13 and the housing 20. As a result, the smooth rotation of the needle roller 14 is hindered. Therefore, it is necessary to satisfy that $1 < r_1/r_3$.

Meanwhile, in a case where the curvature radius $r_1$ of the outer ring member 12 is larger than the $r_3$ of the inner diameter of the housing 20 too much, when the outer ring is forcibly incorporated, the raceway surface of the outer ring member 12 could be undulated or damaged. Thus, the value β that satisfies $r_1/r_3 \beta$ varies depending on the thickness "t" of the outer ring member 12 as shown in Table 2. Here, the reason why the value of the β is increased as the thickness "t" is reduced is that as the thickness becomes small, the elastic deformability becomes high.

Figure 5:
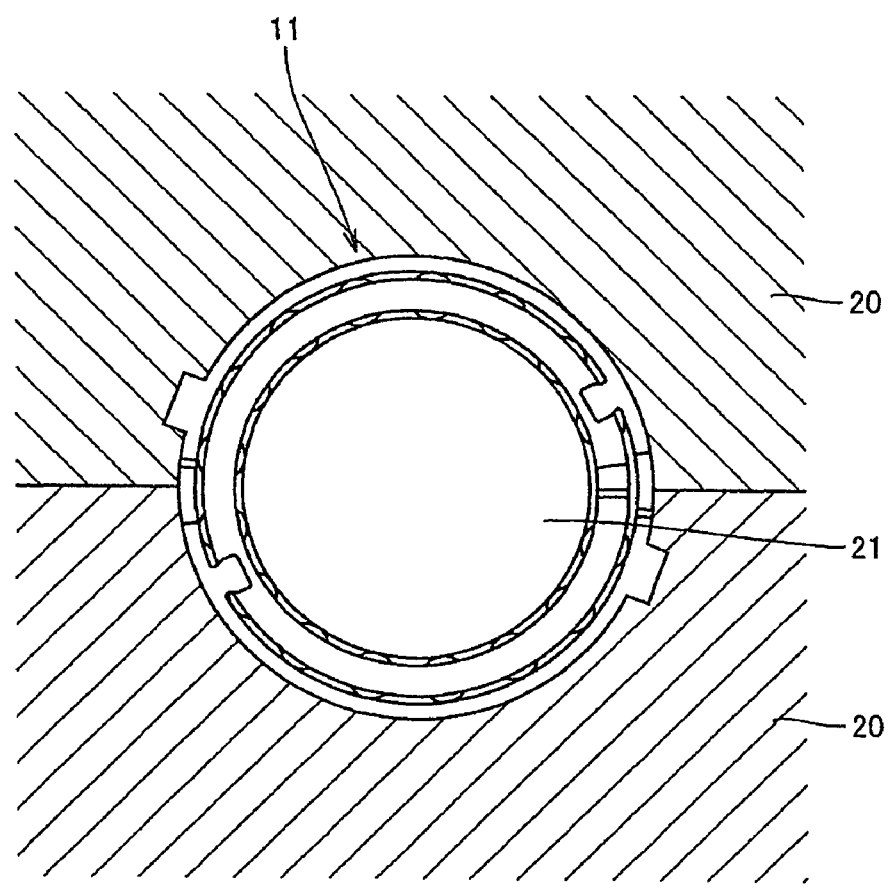
FIG. 5 is a view showing a state after the needle roller bearing is incorporated in the housing.
Figure 6:
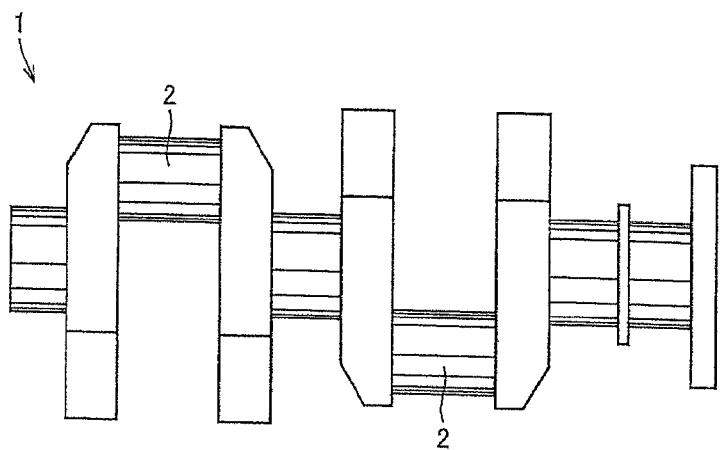
FIG. 6 is a view showing a crankshaft of a car.
Figure 7:
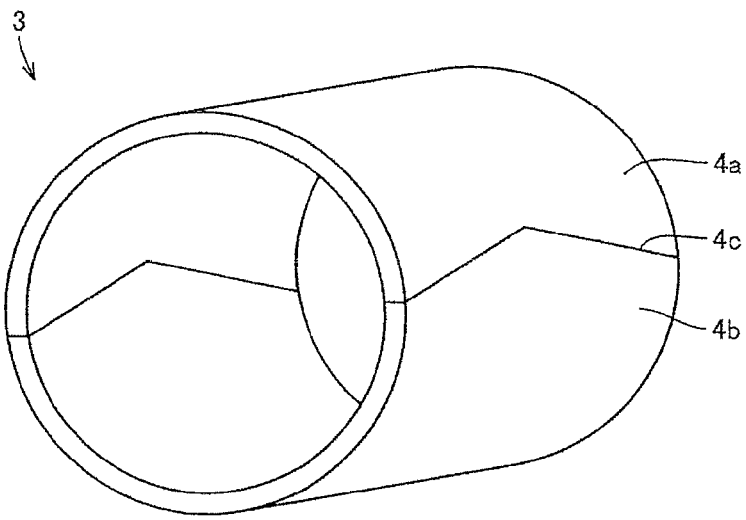
FIG. 7 is a schematic view showing an outer ring that is used in the needle roller bearing and can be split in the diameter direction.

When the needle roller bearing 11 that supports a rotation shaft 21 is incorporated in the housing 20, since the outer ring member 12 is elastically deformed and has a configuration along the housing 20 as shown in FIG. 5, the needle roller bearing 11 can maintain the smooth rotation of the needle rollers 14.

Although the embodiments of the present invention have been described with reference to the drawings in the above, the present invention is not limited to the above-illustrated embodiments. Various kinds of modifications and variations may be added to the illustrated embodiments within the same or equal scope of the present invention.

The present invention can be advantageously applied to a needle roller bearing that supports a crankshaft, a camshaft, a balance shaft, and a rocker shaft of a car, and the like.

What is claimed is:

1. A needle roller bearing comprising:
an outer ring comprising a plurality of split outer ring members, the split outer ring members split by parting lines extending in the axial direction of the bearing;
a plurality of needle rollers rotatably arranged on the raceway surface of said outer ring; and
a retainer retaining said plurality of needle rollers, wherein a curvature radius r1 of said split outer ring member and a curvature radius r2 of the outer diameter of said retainer has a relation such that $1 < r1/r2 < 1.30$, and said split outer ring members each have an engagement part engaging with a housing to be positioned, at a position shifted from the center in its circumferential direction;
wherein each said split outer ring member has an engagement click provided at a part of an end in its width direction, the engagement click protruding toward the inner side in its diameter direction and extending around the split outer ring member less than 360 degrees to prevent said retainer from moving in the axial direction; and
further wherein when a circumscribing circle of the needle rollers held by the retainer aligns with an inner diameter surface of one of the split outer ring members, a curvature center of the split outer ring member and a curvature center of the retain exist at different positions.

2. A bearing structure comprising:
a needle roller bearing comprising
an outer ring comprising a plurality of split outer ring members, the split outer ring members split by parting lines extending in the axial direction of the bearing,
a plurality of needle rollers rotatably arranged on an raceway surface of said outer ring, and
a retainer retaining said plurality of needle rollers; and
a housing holding said outer ring of said needle roller bearing, wherein a curvature radius r1 of said split outer ring member and a curvature radius r3 of the inner diameter of said housing has a relation such that $1 < r1/r3 < 1.30$, each said split outer ring member has an engagement part engaging with a housing to be positioned at a position shifted from the center in its circumferential direction,
wherein each said split outer ring member has an engagement click provided at a part of an end in its width direction, the engagement click protruding toward the inner side in its diameter direction and extending around the split outer ring member less than 360 degrees to prevent said retainer from moving in the axial direction; and
further wherein when a circumscribing circle of the needle rollers held by the retainer aligns with an inner diameter surface of one of the split outer ring members, a curvature center of the split outer ring member and a curvature center of the retain exist at different positions.

* * * * *